United States Patent [19]
Hamblen

[11] Patent Number: 4,765,127
[45] Date of Patent: Aug. 23, 1988

[54] SELF-SHARPENING MOWER BLADE

[76] Inventor: Elic S. Hamblen, 5115 S. U.S. 27, Leesburg, Fla. 32748

[21] Appl. No.: 77,110

[22] Filed: Jul. 23, 1987

Related U.S. Application Data

[63] Continuation-in-part of Ser. No. 906,430, Sep. 12, 1986, abandoned.

[51] Int. Cl.$^4$ .............................................. A01D 34/73
[52] U.S. Cl. ........................................ 56/295; 56/255; 30/276
[58] Field of Search ...................... 56/12.1, 12.7, 17.5, 56/255, 295, 320.1; 30/276

[56] References Cited

U.S. PATENT DOCUMENTS

| | | | |
|---|---|---|---|
| 3,035,359 | 5/1962 | Ewert | 56/295 |
| 3,315,451 | 4/1967 | Hill | 56/295 |
| 3,538,692 | 11/1970 | Cope et al. | 56/295 |
| 3,683,606 | 8/1972 | Staines | 56/295 |
| 3,975,891 | 8/1976 | Gunther | 56/295 |
| 4,235,068 | 11/1980 | Comer | 56/295 |
| 4,250,621 | 2/1981 | Houle | 56/295 |
| 4,297,831 | 11/1981 | Pioch | 56/295 |
| 4,320,617 | 3/1982 | Fedeli | 56/295 |
| 4,351,144 | 9/1982 | Benenati | 56/295 |
| 4,512,141 | 4/1985 | Matthews et al. | 56/295 |
| 4,611,459 | 9/1986 | Cartner | 56/295 |
| 4,715,173 | 12/1987 | Anderson | 56/295 |

FOREIGN PATENT DOCUMENTS 1451434 9/1966 France .................................. 56/12.7

Primary Examiner—John Weiss
Attorney, Agent, or Firm—James H. Beusse

[57] ABSTRACT

A blade for a rotary mower comprising an elongated, flat metallic member having first and second ends and a central aperture for mounting the member on a shaft for rotation in a cutting plane, each of the first and second ends having a leading cutting edge and a trailing cutting edge, the leading cutting edge being formed on a downturned portion of a leading edge of the metal member when the member is rotating in the cutting plane and the trailing cutting edge being formed on an upturned portion of an edge opposite the leading edge, the downturned portion being angled between 15 and 45 degrees with respect to the cutting plane. The blade may include air dams formed on upper and lower surfaces, respectively, of the member parallel to and coterminous with the cutting edges. In another form, the blade may have first and second end portions forming extensions oppositely directed from a central portion, each of the end portions being angularly oriented with respect to the cutting plane, cutting edges being formed on the end portions, the cutting edges being defined by the angular orientation of the end portions with the cutting plane.

3 Claims, 2 Drawing Sheets

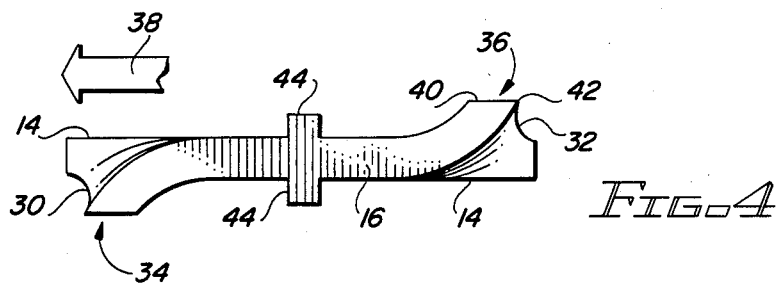
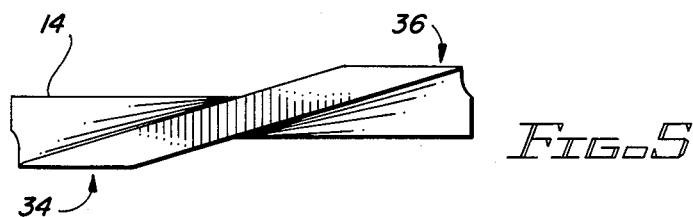
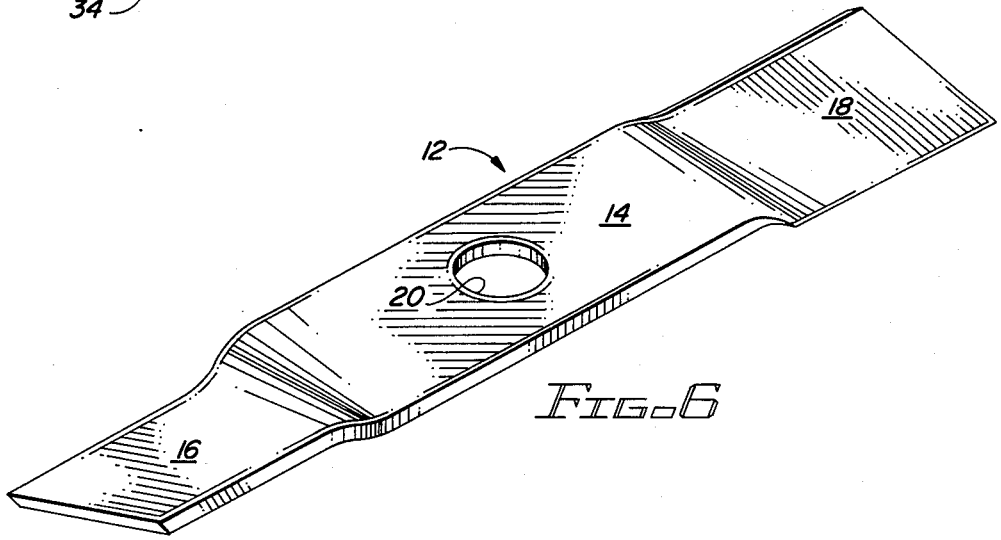
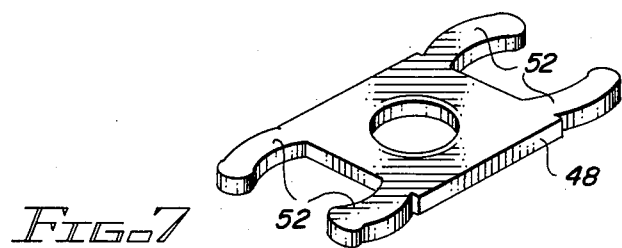
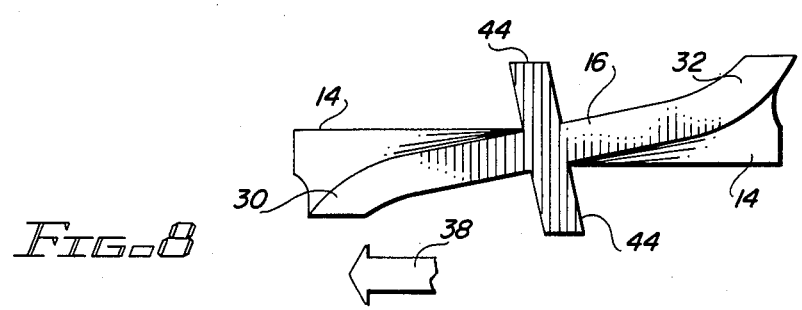

SELF-SHARPENING MOWER BLADE

This application is a continuation in part of application Ser. No. 906,430, filed Sept. 12, 1986, now abandoned.

This invention relates to cutting blades for rotary mowers and, more particularly, to self-sharpening blades for rotary mowers.

BACKGROUND

Rotary mowers, such as, for example, those used for cutting lawns, generally have an engine mounted on a wheeled chassis and connected to rotatably drive a shaft extending through the chassis normal to a cutting plane. The cutting plane is normally parallel to a plane of the lawn being mowed. The shaft may be either a drive shaft protruding directly from the engine or it may be a shaft coupled by gears and/or pulleys and V-belts to a drive shaft of the engine. Blades for such mowers are generally flat, elongated pieces of metal which are mounted for symmetrical rotation with respect to an axis of the shaft. A blade has a sharpened leading cutting edge on an outer portion distal from the central shaft mounting point on each end thereof. Most blades also include a raised outer trailing edge opposite the leading edge which causes the blade to generate a fan effect for lifting and blowing clippings from under the mower.

Maintaining a sharp cutting edge on a blade is of concern in order to cleanly sever the tips of grass. When a blade becomes dull, it tends to tear the grass leaving frayed ends which become brown and give an unsightly appearance to a lawn. In heavy cutting applications such as for weed clearing, a dull blade will effect performance of a mower since it requires more work for the mower to force the blade through the cutting strokes. Even in light cutting situations a dull blade may result in early deterioration of the mower.

There have been a number of prior developments in the mower field directed toward the problem of dull blades. For example, U.S. Pat. Nos. 4,375,148 and 4,611,459 disclose rotary mower blades. U.S. Pat. No. 4,375,148 proposes a blade having replaceable cutting inserts while U.S. Pat. No. 4,611,459 proposes blade extensions which are both replaceable and reversible. While these proposals are both improvements over the standard blade in terms of aiding the problem of dull blades, it is believed that neither of these proposals are suitable for general use where safety precludes the use of objects which can become loose and be thrown by the high rotational speed of the rotary mower. Furthermore, the disclosed blades still require sharpening or at least replacement of the dull inserts.

SUMMARY OF THE INVENTION

It is an object of the present invention to provide a blade for a rotary mower which overcomes the above and other disadvantages of the prior art. In particular, it is an object of the present invention to provide a rotary mower blade which reduces the rate at which such blades become dull and which is reversible with two cutting edges, one of which is being sharpened while the other is cutting.

In one form of the invention there is provided a blade for a rotary mower comprising an elongated, flat metallic member having first and second ends and a central aperture for mounting the member on a shaft for rotation in a cutting plane, each of the first and second ends having a leading cutting edge and a trailing cutting edge, the leading cutting edge being formed on a downturned portion of a leading edge of the metal member when the member is rotating in the cutting plane and the trailing cutting edge being formed on an upturned portion of an edge opposite the leading edge, the downturned portion being angled between 15 and 45 degrees with respect to the cutting plane. In another form, the blade may include first and second air dams formed on upper and lower surfaces, respectively, of the member parallel to and coterminous with the cutting edges, the air dams having a height extending from the member normal to the cutting plane substantially coextensive with the upturned and downturned edges of the member.

In still another form of the invention, the blade may comprise an elongated, flat metallic member having a central portion lying in a cutting plane, the central portion having a central aperture for receiving a shaft oriented normal to the cutting plane, and having first and second end portions forming extensions oppositely directed from the central portion, each of the end portions being angularly oriented with respect to the cutting plane, cutting edges being formed on the end portions, the cutting edges being defined by the angular orientation of the end portions with the cutting plane.

BRIEF DESCRIPTION OF THE DRAWING

FIG. 4 is an end view of the blade of FIG. 1;

FIG. 5 is an end view of an alternate form of the present invention;

FIG. 6 is a perspective view of the blade of FIG. 5.

FIG. 7 is a connector for connecting blade sections; and

FIG. 8 is an alternate form of the blade of FIG. 4.

DETAILED DESCRIPTION OF THE INVENTION

Figure 1:
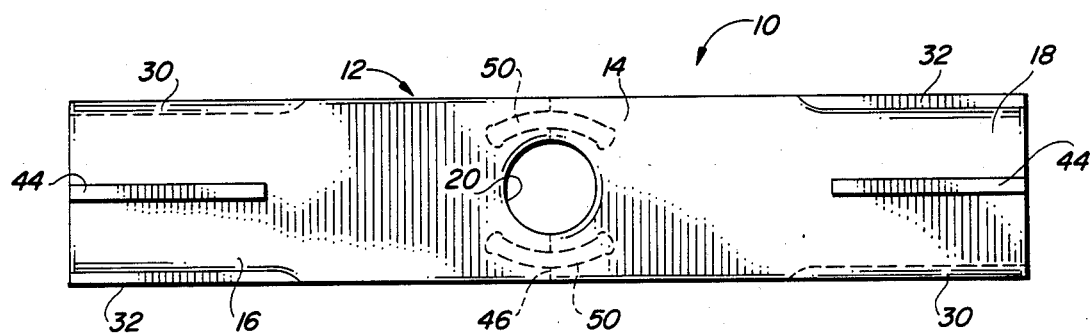
FIG. 1 is a top planar view of one form of the inventive mower blade.
Figure 2:
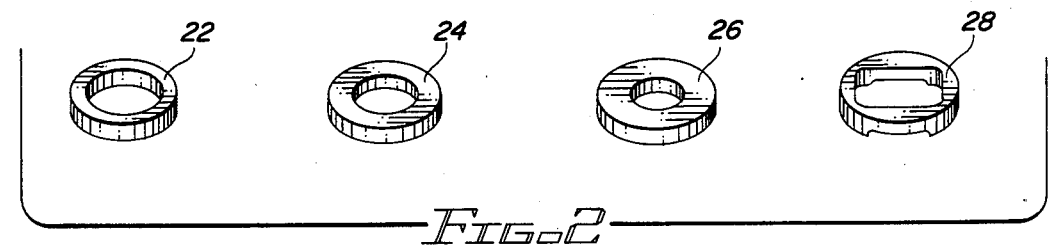
FIG. 2 is a perspective view of several adapters for use in coupling my inventive blade to different sizes of drive shafts.
Figure 3:
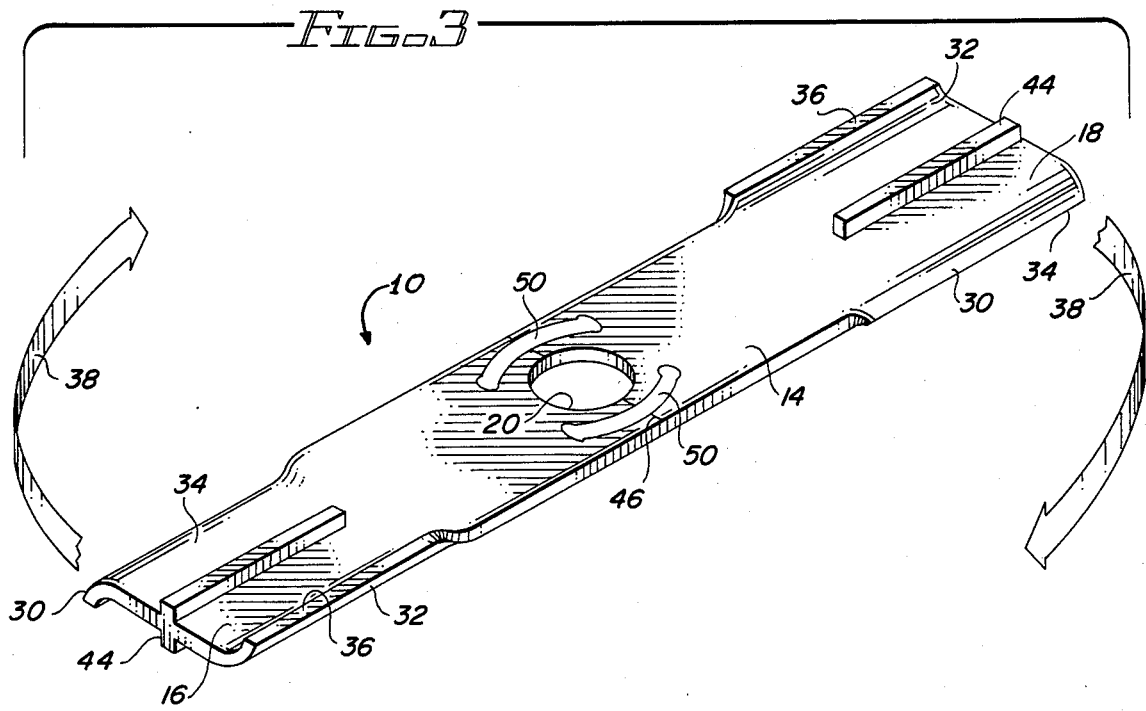
FIG. 3 is a perspective view of the blade of FIG. 1.

Referring now to the drawing and in particular to FIGS. 1 and 3, there is shown a top planar view and a perspective view of one embodiment of my inventive self-sharpening rotary mower blade. The blade, designated generally at 10, comprises an elongated, flat metallic member 12 having a main or central portion 14 and first and second outer portions or ends 16,18. The central portion 10 is symmetrical about a center mounting hole 20, which hole is used for mounting the blade to a driven shaft (not shown) of a mower. Since mower shafts may be of various diameters, the hole 20 is provided as an oversized hole with a plurality of washer type inserts 22, 24, 26 and 28 shown in FIG. 2 specifically adapted to fit into hole 20. Each insert has a different inside diameter or shape so as to provide a snug fit between the blade and shaft.

As shown in FIG. 3 and FIG. 4, the end portions 16,18 each have a downward turned leading edge 30 and an upwardly turned trailing edge 32, leading and trailing being defined with respect to the direction of rotation of blade 10 and upward and downward being defined with respect to a surface being mowed. The edges 30,32 preferably angle from a plane of the blade 10 at an angle between about 15 and 45 degrees. The edges 30,32 may extend as much as from ⅛ to ¾ inch from the plane of blade 10. The depending surfaces 34,36 of edges 30,32, respectively, form a cutting edge for the blade. The surfaces 34,36 are initially machined to lie in corresponding planes parallel to the plane of blade 10. The plane of blade 10 is generally referred to as the cutting plane since the blade rotates for cutting in that plane even though the level at which a lawn, for example, is cut may be slightly removed from that plane.

The action of the blade 10 in performing the cutting or mowing function can best be seen by reference to FIG. 4. The blade is assumed to rotate in the direction of arrow 38 so that the downwardly turned leading edge 30 acts as a cutting edge. The relatively high velocity with which the blade contacts grass or weeds causes the edge 30 to shear such material. As with any cutting edge, the constant impact with grass, weeds and other debris abrades the blade leading edge causing it to erode to a rounded or dulled edge. However, the process of dulling the edge is somewhat ameliorated by the action of the abrasive material in eroding the surface 34. That is, the wearing away of the surface 34 reduces the rate at which the leading edge becomes so dull as to need re-sharpening. This abrasive wearing away or erosion is caused not only by the grass and weeds being cut but also by sand and other debris picked up by the rotating blade. The upturned edge 32 acts to force air to circulate and to be driven from under a housing (not shown) in which the blade is mounted. This action is well known and most mower blades have an upwardly turned portion for this purpose. The moving air carries the grass clippings from under the mower while the air being pulled from below the blade causes the grass and weeds to stand up to facilitate cutting.

In the present invention, the upturned edge 32 is a mirror image of the downturned edge 30 so that the blade can be flipped to reverse the edges. The debris, including grass and weed clippings and sand or dirt, pulled up by the action of the rotating blade passes over the top surface of blade 10 and abrades the surface 36 of upturned edge 32. Considering the surface 36, it has a leading edge 40 and a trailing edge 42. The action of the debris passing over surface 36 is to erode the surface so that edge 42 becomes sharpened, i.e., any rounded portion of edge 42 is worn away. Applicant has found that the rate of sharpening of edge 42 is faster than the rate of dulling of edge 30. Since the blade 10 is symmetrical, when the edge 30 becomes dull, the blade can be removed from the shaft, flipped over, and re-attached so that a sharpened edge is available for mowing. In essence, the blade 10 is self-sharpening.

FIGS. 3 and 4 also illustrate air dams 44 attached to the upper and lower surfaces of blade end portions 16,18. The dams 44 serve to block some of the debris from flowing over the upturned edge 32. As mentioned above, since sharpening occurs at a faster rate than dulling, the edge 32 tends to be eroded more than edge 30. The dams 44 reduce the erosion rate and enhance the useful life of the blade 10.

Turning now to FIGS. 5 and 6, there is shown another embodiment of the present invention in which the blade end portions 16,18 are twisted to form a planar cutting end at an angle to the cutting plane. In this form, the ends of the blade are twisted rather than bending the edges of the ends 16,18. The action of the blade is essentially the same as that of the previous embodiment. The twisted ends act as fan sections with cutting edges. Air dams, such as dams 44, may also be used in this embodiment. The angle of the end portions 16,18 with respect to the cutting plane is preferably between about 15 and 45 degrees. For angles less than about 15 degrees, the sharpening effect is reduced. For angles greater than about 45 degrees, the load transmitted to the drive shaft becomes excessive. Applicant has found that an angle of 25 degrees, for either the embodiment of FIG. 3 or FIG. 5, represents an optimum angle. For the embodiment of FIG. 3, the angle is that associated with the upturned and downturned edges 30,32. The cutting edge is defined by the lower surface 34, parallel to the cutting plane, and the plane of the angled or twisted portion of the blade. In both illustrated embodiments, the cutting edge is inverted from that of a standard blade.

Applicant has found that the blade tips wear or abrade away faster than other portions of a blade. Since the tips generally contact the grass and weeds first and thus perform most of the cutting function, such wear is expected. FIG. 1 illustrates one means of compensating for such wear by providing a blade which can be separated into two sections along a mid-line 46. A blade connector 48, FIG. 7, is then used to space the two sections apart and to simultaneously connect the two sections into a unified structure. To this end, the blade 10 may be provided with arcuate shaped slots 50 bisected by mid-line 46. The connector 48 includes arcuate shaped protrusions 52 which mate with slots 50. Once connected, the structure may be compressed between oversized washers (not shown) for maintaining the unified structure.

FIG. 8 is an alternate form of the blades of FIGS. 4 and 5 which combines the angle blade end sections of FIG. 5 with the turned edges of FIG. 4. This blade arrangement provides greater "lifting" power to enable grass and weeds to be pulled upright. The twisted or fan shaped portions 16,18 of the blade can be extended mearly to the mounting aperture 20 to provide maximum lifting ability.

What has been disclosed are preferred embodiments of a self-sharpening blade for a rotary mower. The invention may be implemented in a form different than shown and it is therefore intended that it be given a scope commensurate with the spirit of the appended claims.

What is claimed is:

1. A reversible, self-sharpening blade for a rotary mower comprising an elongated, flat metallic member having first and second ends and a central aperture for mounting the member on a shaft for rotation in a cutting plane, each of said first and second ends having a downwardly turned leading edge and an upwardly turned trailing edge bilaterally symmetrical about a blade centerline extending end-to-end of said member, a leading cutting edge being defined on each downturnedly turned leading edge of said member when said member is rotating in the cutting plane and a trailing cutting edge being defined on each upturnedly turned edge of said member, said turned edges being commonly angled in opposite directions between 15 and 45 degrees with respect to the cutting plane, said cutting edge being defined by an edge of said turned leading edge lying in the cutting plane, said blade including first and second air dams formed on upper and lower surfaces, respectively, of said member parallel to and coterminous with said cutting edges, said air dams having a height extending from said member normal to the cutting plane substantially coextensive with said upturned and downturned edges of said member.

2. A reversible, self-sharpening blade for a rotary mower comprising an elongated, flat metallic member having first and second ends and a central aperture for mounting the member on a shaft for rotation in a cutting plane, each of said first and second ends having a downwardly turned leading edge and an upwardly turned trailing edge, a leading cutting edge being defined on each downwardly turned leading edge of said member when said member is rotating in the cutting plane and a trailing cutting edge being defined on each upwardly turned edge of said member, said turned edges being commonly angled in opposite directions between 15 and 45 degrees with respect to the cutting plane, said blades including first and second air dams formed on upper and lower surfaces, respectively, of said member parallel to and coterminous with said cutting edges, said air dams having a height extending from said member normal to the cutting plane substantially coextensive with said upturned and downturned edges of said member.

3. A method for automatically sharpening a blade for a rotary mower during the mowing of grass, the blade including a generally elongated flat portion releasably mounted in an assembly position generally symmetrical about a rotatable shaft of the rotary mower, a pair of generally opposite end portions on the flat portion with each opposite end portion being a pair of cutting edges, one of the cutting edges having predeterminately angularly spaced beneath the flat portion and defining a cutting plane and the other of the cutting edges being predeterminately angularly spaced above the flat portion, the method comprising the steps of:

rotating the blade in one direction and presenting the one cutting edge to the grass to effect the mowing thereof;

directing earthen particles which may be dislodged during the mowing and the mowed grass over the other cutting edge of the blade and impinging at least some of the dislodged earthen particles and mowed grass against the other cutting edge to effect the automatic sharpening thereof during the presenting step;

inverting the blade in its assembly position on the rotary shaft when the one cutting edge becomes dull and thereby interchanging the sharpened other cutting edge with the dull one cutting edge so as to present the sharpened other cutting edge in the cutting plane to the grass to be mowed when the blade is rotated in the one direction;

rotating the blade in the one direction and directing earthen particles which may be dislodged during the mowing and the mowed grass over the one cutting edge of the blade and impinging at least some of the dislodged earthen particles and mowed grass against the one cutting edge to effect automatic sharpening thereof during the presenting step;

re-inverting the blade in its assembly position on the rotary shaft when the other cutting edge becomes dull and thereby interchanging the sharpened one cutting edge with the dull other cutting edge so as to again present the sharpened one cutting edge in the cutting plane to the grass to be mowed when the blade is rotated in the one direction; and repeating the steps of directing, inverting, directing and re-inverting as the one and the other cutting edges become alternately dull so as to repetitively present a sharpened cutting edge for mowing.

* * * * *